A. H. JONES.
Extension-Chandelier.
No. 225,612.   Patented Mar. 16, 1880.
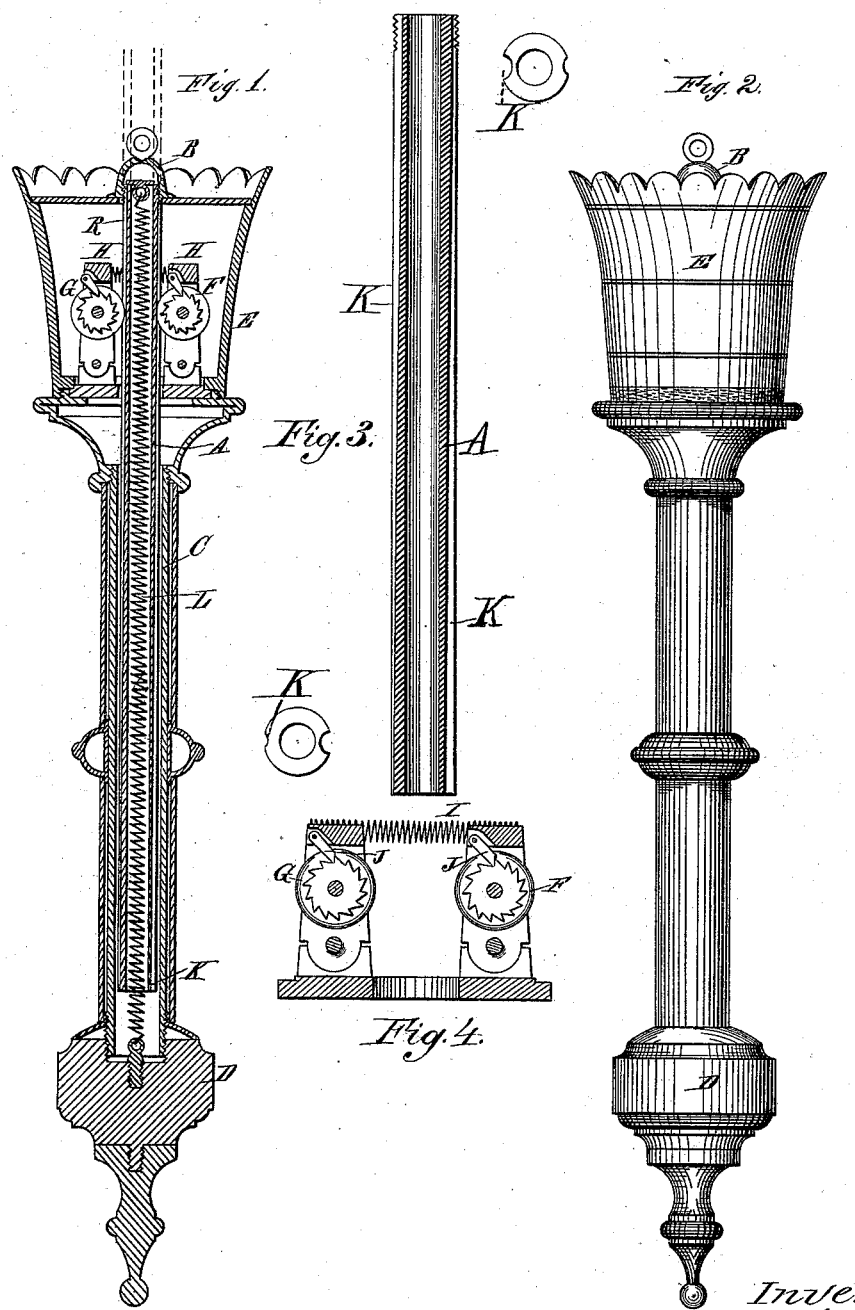
Witnesses:
Charles H. Searle
R. A. Lane
Inventor
Augustus H. Jones
By A. C. Thayer
Attorney.

UNITED STATES PATENT OFFICE.

AUGUSTUS H. JONES, OF MERIDEN, CONNECTICUT.

EXTENSION-CHANDELIER.

SPECIFICATION forming part of Letters Patent No. 225,612, dated March 16, 1880.

Application filed October 17, 1879.

*To all whom it may concern:*

Be it known that I, AUGUSTUS H. JONES, of Meriden, in the county of New Haven and State of Connecticut, have invented a new and Improved Extension-Chandelier, which is fully described in the following specification.

The essential feature of my invention consists of a pair of spring-pressed friction devices attached to the drop and working on opposite sides of the hanging tube and acting alternately—that is, one produces friction when the drop descends, but not when it ascends, while the other acts reversely thereto, so that while they gripe with sufficient tension to hold the drop at any point they offer less resistance against shifting it than they would if they both acted both ways. The said friction devices consist, by preference, of a pair of rollers with self-acting ratchets and pawls, one of which is arranged to let its roller turn when the drop ascends and the other to let its roller turn when it descends; but I may use pads or blocks on pawls fixed to operate in like manner, or one pad or block and pawl may be used with one roller and ratchets. The hanging tube has a groove on each side for these devices to work in, and said grooves are so graduated that they diminish or shallow in depth in the direction in which the friction acts to increase the same, and thereby offer greater resistance as the momentum of the sliding part increases.

The apparatus is applicable for gas or any other kind of chandeliers.

Figure 1 is a sectional elevation of my improved extension-chandelier. Fig. 2 is a side elevation. Fig. 3 shows a vertical section of the tube, also one cross-section taken near the top and another near the bottom of the same. Fig. 4 is a detail of the friction devices.

A is the hanging tube, which may be suspended by an eye-cap, B, when it is used for oil, or have the usual gas-connection when gas is to be used.

C is the drop-tube, to which the usual arms will be attached at D. On the top of said drop-tube is a little case or cage, E, within which the rollers F G are mounted in the pivoted supports H, so as to be pressed against opposite sides of tube A by the springs I.

Roller F has a ratchet and a pawl, J, adjusted to allow it to turn freely when the drop slides upward, and roller G has a similar ratchet and a pawl, adjusted to allow it to turn freely when the drop descends; but both rollers are held in the respective reverse motions of the drop to act as friction devices to resist the sliding of the drop.

For each roller the tube A has a groove, K, to work in, to provide suitable breadth of bearing for the roller and to prevent the drop from turning around. These grooves are graduated in depth from one end to the other, being deepest at that end where the sliding of the friction device begins and shallowest at the other, so that the pressure of the friction device increases, and thus contracts the tendency of the drop to increase in speed too much after being set in motion.

The springs I are to be adjusted with sufficient tension to produce the requisite friction for holding the drop in position. They may be attached with adjustable devices for regulating the tension, if preferred; but they will work for a long time without requiring any change after being suitably adapted at first.

The duplicate friction devices contrived to act in the reverse method herein described are better than one or more devices acting alike both ways, because it gives greater uniformity of action, and consequently allows of more delicate adjustment with less perfect shape of the tube on which they act—that is to say, any irregularities of the tube A in size will be compensated better by one rolling device and one sliding device than they will be without such rolling action, so that in this arrangement the action is smooth and steady, whereas it is stiff and hard or slack in the other, according to the variations of the tube.

When one roller and one pad or block are used the pad or block may act in both directions to make friction, and the roller may roll with both movements of the drop, and in that case only one groove will be required in the tube A.

The coiled spring L within the tube A, for balancing the drop, it will be observed, is wholly inclosed within the gas-space, and is so arranged that its use therein does not involve any openings through the pipes or joints through which the gas may leak, which makes additional tubes necessary, as in the case of the flat coiled steel bands sometimes used, and it is a more desirable arrangement than the springs used outside, as in some kerosene-fixtures, because of being concealed from view.

Having thus described my invention, what I claim, and desire to secure by Letters Patent, is—

1. The combination, in an extension-chandelier, of friction devices mounted on the drop and spring-pressed alike against opposite sides of the hanging tube, but only one of which produces the friction for holding the drop, substantially as described.

2. The combination, in an extension-chandelier, of friction devices mounted on the drop and spring-pressed alike against opposite sides of the hanging tube, of which one only produces the friction when the drop ascends, and the other when it descends, substantially as described.

3. The combination, in an extension-chandelier, of friction devices mounted on the drop and spring-pressed alike against opposite sides of the hanging tube, which act alternately, as described, and bear in grooves in the sides of the hanging tube, which grooves diminish in depth along the way in which said devices act in producing the friction, substantially as described.

4. The combination, with tube A and drop C, of the rollers H and G and springs I, said rollers being mounted on pivoted bearings, and having ratchets and pawls automatically operating in the reverse order described.

AUGUSTUS H. JONES.

Witnesses:
W. J. MORGAN,
M. J. HANLAN.